Sept. 19, 1939. W. S. WATTS 2,173,463
SECTIONAL DISPLAY DUMMY FOR ICE CREAM CONFECTIONS
Filed March 1, 1938
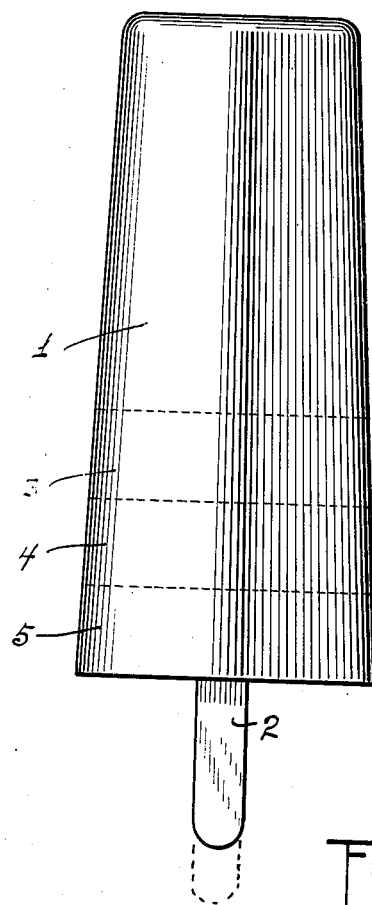
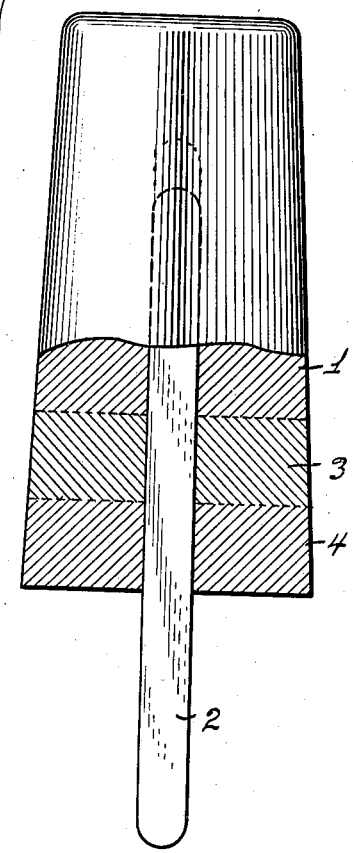
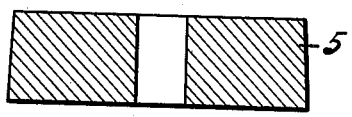
INVENTOR
WARREN S. WATTS.
BY
ATTORNEY Patented Sept. 19, 1939

2,173,463

UNITED STATES PATENT OFFICE 2,173,463

SECTIONAL DISPLAY DUMMY FOR ICE CREAM CONFECTIONS

Warren S. Watts, Montclair, N. J., assignor to Eskimo Pie Corporation, Bloomfield, N. J., a corporation of Delaware Application March 1, 1938, Serial No. 193,222

1 Claim. (Cl. 35—49)

The object of the present invention is to provide a sectional display dummy for frozen confections mounted on a stick. Such confections are manufactured by freezing an ice cream, ice or sherbet mixture in multi-cavity molds and either solidifying the mixture about sticks held in situ within the mold cavities or pressing sticks into the confections after they are frozen.

The present invention has special utility in the sale of frozen confections on sticks and also of molds and apparatus for producing the confections inasmuch as a salesman may demonstrate the actual appearance of a frozen confection of various weights and sizes, and also may demonstrate the proper degree of insertion of the stick into the confection. This is accomplished by providing a dummy comprising the form of a frozen confection of major size which includes a plurality of removable sections in conjunction with a stick for frictionally holding the sectional dummy, which stick may be moved to various positions relatively thereto.

The invention will be described with reference to the accompanying drawing, in which—

Figure 1 is a view in elevation of an embodiment of the invention, showing in dotted lines an outward movement of the stick.

Figure 2 is a view similar to Figure 1, partly broken away, one of the dummy sections having been removed, and showing in dotted lines an inward movement of the stick.

Referring to the drawing, the dummy comprises a major element 1 of wood, light metal or other suitable material shaped in accordance with a desired form of frozen confection of minimum size and weight. Formed at the center and longitudinally of element 1 is a stick-receiving aperture of any desired length, this aperture being adapted to receive a stick 2 with close fit thereof so that when the stick is inserted the combined element and stick may be manipulated without relative movement thereof.

Below element 1 are a plurality of corelated elements such as 3, 4 and 5, which are formed with stick-receiving apertures extending completely through them. These apertures also will be so formed that the stick will frictionally engage the aperture walls with sufficient contact to prevent downward movement of members 3, 4 and 5, or either of them, relatively to the stick when the dummy is held upright by the stick.

In frozen confections of the same type, it is customary in the trade to provide a frozen confection, of a certain type, in various sizes and weights according to the prices at which they are to be sold or the territory in which they are to be sold. Assuming that element 1 is of the minimum trade size and weight, each of the sections 3, 4 and 5 may be considered as adding one ounce thereto. Thus with sections 3, 4 and 5 removed from the stick, the stick may be moved inwardly to its normal position when carried by such a small unit and the appearance thereof on the stick may be immediately visualized. To show a confection of the same type with an added weight, and therefore volume, it is only necessary to slide onto the stick one or more of the sections, as the case may be, and to adjust the position of the stick accordingly in order to visualize such confection of increased weight and size.

I have found that a suitable material for constructing the dummy is hard wood inasmuch as an ideal frictional engagement with the stick can be secured and the device may be inexpensively formed. However, metal such as aluminum or light plastics may be employed with satisfactory results.

Having described my invention, what I claim and desire to secure by Letters Patent is as follows:

A sectional display dummy for frozen confections, comprising a plurality of associated sectional elements formed, when in laminated mutual contact, to represent a frozen confection, the topmost of the elements formed as a complete frozen confection of a desired minimum size, and the lowermost elements each being of predetermined size and having the same form as that of the first element to represent a size addition, the stick having sliding relation with all of the elements.

WARREN S. WATTS.